Patented Aug. 21, 1951

2,564,726

UNITED STATES PATENT OFFICE 2,564,726

POLYMERIC COMPOUNDS

William Russell Saner, Plainfield, N. J., assignor to E. I. du Pont de Nemours and Company, Wilmington, Del., a corporation of Delaware No Drawing. Application April 19, 1949, Serial No. 88,490

8 Claims. (Cl. 260—88.3)

This invention relates to salts of vinylpyridine polymers. More particularly it relates to salts of vinylpyridine polymers with acid dyes. Still more particularly it relates to salts of polyvinylpyridine with acid dyes. The invention further relates to processes of preparing such salts.

An object of this invention is to provide a new class of polymeric compounds. A further object is to provide new salts of vinylpyridine polymers. A more specific object is to provide novel salts of polyvinylpyridine with acid dyes. Still other objects will be apparent from the following description of the invention.

It has been found that water-insoluble vinylpyridine polymers which are soluble in 1% aqueous acetic acid and form clear, hard resinous films can be converted into polymeric salts by admixing them with acid dyes. Such dyes are generally of high molecular weight and contain sulfonic acid or carboxylic acid groups. The polymeric acid dye salts form hard smooth layers which are resin-like in appearance but are colored in accordance with the tinctorial properties of the acid dyes used to form the salts. The polymeric acid dye salts have various utility in the arts and form colored layers which may be used as light-filtering layers.

The salts of the vinylpyridine polymers with acid dyes may be prepared by simply admixing a vinylpyridine polymer or a mixture of such polymers with an acid dye or a mixture of such dyes containing a sulfonic acid or a carboxylic acid group or groups in an aqueous medium. A polymeric vinylpyridine polymer salt of the acid dye precipitates out and can be purified by washing in water and recrystallizing from an organic solvent. The lower alkanols, e. g., methanol and ethanol, are especially useful for reprecipitating the polymeric salts. The acid dyes used to form the salts confer a color to the resulting polymeric salt which is substantially the same as that of the original acid dye. The polymeric acid dye salts can be dissolved in an organic solvent, e. g., methanol or ethanol, or a mixture of such solvents and coated onto a support to form a colored layer. They may also be admixed with various coating compositions, e. g., compatible resins, colloids, etc., and used to form colored layers or plastic articles.

The vinylpyridine polymers used as initial reactants can be made by polymerizing a monomeric vinylpyridine of relatively low molecular weight, e. g., alpha-, beta- or gamma-vinylpyridine, or a homologue thereof containing an alkyl radical of 1 to 4 carbon atoms in the pyridine ring, in a liquid medium by the aid of a vinyl compound polymerization catalyst. An organic solvent solution can be used as the liquid medium, if desired. However, the organic solvent should be inert so that it will not interfere with the polymerization reaction. The polymers can be made by emulsion polymerization, if desired, and bulk polymerization methods are effective. The polymerization is preferably carried out in an aqueous acid solution or medium in the presence of a peroxy compound catalyst at temperatures from about 20 to 50° C. for a period of 10 or less to 200 or more hours. The proportion of acid, e. g., hydrochloric or sulfuric acid, used may vary over a fairly wide range, e. g., from 0.5 to 2.5 moles of acid per mole of vinylpyridine monomer.

The resulting solution may be diluted with water and admixed with a basic solution, e. g., aqueous sodium hydroxide, whereupon a vinylpyridine polymer precipitates and can be washed and dried. In some cases, it is desirable to incorporate a neutralizing agent in the washing solutions to remove any remaining acid catalyst.

The vinylpyridine polymers described above, including the lower alkyl substituted polyvinylpyridines, are of relatively high molecular weight and form clear, hard resinous films. They are soluble in 1% aqueous acetic acid and other acids, e. g., hydrochloric, sulfamic, sulfuric and oxalic acids.

The polymers in question need not consist wholly of a single polymerized monomer. On the contrary, a mixture of two or more of the monomeric vinylpyridines described above can be used. In addition, copolymers which contain up to 20% of another polymerizable vinyl or vinylidene compound ($CH_2=C<$) are useful. These compounds may be admixed with the monomeric vinylpyridine, and the polymerization carried out in a similar manner. The copolymers should likewise be soluble in 1% aqueous acetic acid. Suitable compounds for copolymerization are styrene, acrylic esters and amides, alpha-alkyl substituted acrylic esters and amides, and acrylonitrile and methacrylonitrile. Among the specific useful compounds of this type are methyl and ethyl acrylates; methacrylamide and n-methylacrylamide; acrylonitrile and methacrylonitrile. Mixtures of two or more of the latter compounds can be used, if desired.

The proportion of the acid dye which is used to make the polymeric acid dye salt of the vinylpyridine polymer or polyvinylpyridine may vary over fairly wide limits, e. g., from 0.01 to 0.5 mole of dye per mole of vinylpyridine monomer. In general, however, amounts of dye salt from 0.05 to 0.10 mole per mole of vinylpyridine monomer are sufficient and constitute a preferred range.

In the case of dyes which have their carboxylic or sulfonic acid group or groups neutralized by a water-soluble salt-forming cation, e. g., alkali metal, ammonium, or amine, the salt-forming reaction with the vinylpyridine polymers must be carried out under acid conditions so that these salts are converted into the free acids. Various organic and inorganic acids may be used. Suitable acids include hydrochloric, sulfuric, and acetic. The acid concentration should be rather low, or sufficient to give a pH in the range of 2 to 3.

In the preferred aspect of the invention, the polymers of the unsubstituted alpha- or 2-vinylpyridine are used to react with the acid dyes. Poly-2-pyridine is a water-insoluble synthetic resin of relatively high molecular weight which is soluble in alcohols, e. g., methyl, ethyl, propyl, and butyl alcohols, and mixtures of such alcohols and also mixtures of these alcohols with ketones, e. g., acetone, methyl ethyl ketone, methyl propyl ketone, and methyl isobutyl ketone. It is also soluble in certain chlorinated hydrocarbons, e. g., trichlorethane and methylene chloride. Poly-2-vinylpyridine forms clear, light-colored, non-tacky resinous films or coatings which are readily and completely soluble in dilute aqueous acids, e. g., 1% acetic acid, hydrochloric, sulfamic, sulfuric, phosphoric, and oxalic acids.

The invention will be further illustrated but is not intended to be limited by the following examples:

Example I

Four tenths gram of Pontacyl Black BBO (Color Index 307) dissolved in 50 milliliters of water was added to 20 milliliters of a 10% solution of poly-2-vinylpyridine (which polymer was soluble in 1% aqueous acetic acid and formed a clear, hard, resin-like film), in methanol whereby a polymeric salt of the acid dye with the poly-2-vinylpyridine was precipitated. The polymeric salt which was isolated was soluble in methanol and ethanol and showed no tendency to bleed in water. When coated from an ethanol or methanol solution on a support, a transparent, hard, resin-like bluish-green film was formed.

Example II

Four tenths gram of Pontacyl Black BBO (Color Index 307) dissolved in 50 milliliters of water was added to 20 milliliters of a 10% solution of poly-2-vinylpyridine (which polymer was soluble in 1% aqueous acetic acid and formed a clear, hard, resin-like film), in methanol containing 2 milliliters of acetic acid. The mixture was then brought to a pH of approximately 5.0 by adding, with stirring, a dilute solution of ammonium hydroxide, whereby a polymeric salt of the acid dye with the poly-2-vinylpyridine was precipitated. The salt had the same physical properties and color as the salt described in Example I and formed similar films.

Example III

Two-tenths gram of a dischargeable green acid dyestuff (Agfa Bro 721; described in report BIOS/Comp./146/2/382/30 obtained from the British Information Services), said dyestuff having a triphenylmethane structure and containing two carboxyl groups, was dissolved in 50 milliliters of a 0.2% solution of ammonium hydroxide and added to a solution of poly-2-vinylpyridine (characteristics as described in Example I) in 70 milliliters of a 0.3% acetic acid solution in water. 1% aqueous acetic acid was added until the pH was approximately 5.0. This caused a polymeric salt of the acid dye to precipitate from solution. The salt was washed and dried and found to be soluble in methanol and ethanol. When applied to a transparent surface from a methanol solution, a green transparent, hard, resin-like film was obtained.

Example IV

A solution of 0.4 gram of the yellow dyestuff, described in Example 2 of the United States Patent 2,274,782, in 50 milliliters of water was added to 20 milliliters of a 10% solution of poly-2-vinylpyridine (having characteristics as described in Example I) in methanol containing 2 milliliters of glacial acetic acid. Twenty-five (25) milliliters of a 2% aqueous solution of ammonium hydroxide was added to the poly-2-vinylpyridine-dye solution, whereby a salt of the acid dye with poly-2-vinylpyridine was precipitated from solution, said salt being washed freely with cold water to remove excess dye. The salt was soluble in a 50/50 mixture of methanol and ethanol. When applied to a clear surface from such a solution, a transparent, hard, resin-like yellow film was obtained.

Example V

Another poly-2-vinylpyridine acid dye salt was made in a manner similar to that described in Example IV by substituting an equivalent of Tartrazine (Color Index 640) for the dye described in the preceding example. The resulting dye salt had properties similar to that of Example IV.

Example VI

Four-tenths gram of Pontacyl Fast Black BBO (Color Index 307) in aqueous solution was added to 20 milliliter of a 10% solution of poly-2-vinylpyridine (having characteristics as described in Example I) in methanol to which had been added sufficient dilute sulfuric acid to give a pH of 1.2. The mixture was thoroughly agitated and adjusted to a pH of 5.5 with dilute ammonium hydroxide, whereby a salt of the acid dye with the polyvinylpyridine was precipitated from solution. The salt which was washed free of excess dye and dried, was soluble in methanol and ethanol. In 1% acetic acid, the salt swelled tremendously but did not dissolve. When applied to a clear surface from an ethanol solution, the salt gave a clear, hard, resin-like blue-green film.

Example VII

Another poly-2-vinylpyridine acid dye salt was made in a manner similar to that described in Example VI by substituting a dilute solution of hydrochloric acid for the dilute sulfuric acid. In this case sufficient hydrochloric acid was added to give a pH of approximately 2.0. It had properties similar to that of Example VI.

Example VIII

Two and 1/10 grams of Pontamine Green S (Color Index 583) dissolved in 300 milliliters of water was added to 120 milliliters of a 10% solution of poly-2-vinylpyridine (having characteristics as described in Example I) in methanol whereby a polymeric salt of the acid dye with the poly-2-vinylpyridine was precipitated. The polymeric salt was soluble in methanol and ethanol and showed no tendency to bleed in water. When coated from an ethanol or methanol solution on a transparent support, a transparent, hard, resinlike yellow-green film was formed.

Example IX

Another polyvinylpyridine acid dye salt was made in a manner similar to that described in Example VIII by substituting an equivalent amount of Pontamine Green BX (Color Index 593) for the dyestuff described in the preceding example. The polymeric salt had the same physical properties and formed a yellow-green film when applied to a transparent surface from ethanol.

Example X

Four-tenths gram of Pontamine Green S (Color Index 583) dissolved in 50 milliliters of water was added to solutions of 2 grams of a copolymer of 2-vinylpyridine and 5-ethyl-2-vinylpyridine (92.5/7.5 parts by weight) in 46 milliliters of methanol whereby a polymeric salt of the acid dye with the copolymer was precipitated from solution. The polymeric salt was soluble in methanol and was highly swollen in dilute acetic acid.

Example XI

Four-tenths gram of Pontamine Green S (Color Index 583) dissolved in 50 milliliters of water was added to a highly swollen gel dispersion of 2 grams of 5-ethyl-2-vinylpyridine polymer in 142 milliliters of methanol, 100 milliliters of water and 21 milliliters of acetic acid. A polymeric salt was formed which when isolated, washed and dried was insoluble in ordinary organic solvents such as methanol, ethanol and acetone.

Example XII

Four-tenths gram of Pontamine Green S (Color Index 583) dissolved in 50 milliliters of water was added to a solution of 2 grams of a copolymer of methyl methacrylate/2 vinylpyridine (10 to 90 mol ratio) in 18 grams of methanol. A salt was precipitated out of solution, which, when washed and dried, was found to be soluble in methanol and was highly swollen in dilute acetic acid.

In place of the particular dyes described in the foregoing examples, there may be used various other acid dyes which form salts with vinylpyridine polymers. Among the other additional useful dyes are:

| | Colour Index No. |
|---|---|
| Pontachrome Black PV or Diamond Black PV | 170 |
| Pontacyl Light Green SF | 670 |
| Pontacyl Brilliant Blue A | 714 |
| Wool Violet S | 50 |
| Lithosol Red C | 165 |

This invention has the advantage that it provides a new and useful class of organic compounds. It provides a simple and practical process for obtaining new colored resins which have utility as coacting compositions. The colored polymeric dye salts are especially useful as light-filtering layers and anti-halation layers in photographic films and plates.

The color index numbers given above are those of the "Society of Dyers and Colourists Colour Index," edited by F. M. Rowe, first ed. January 1924, published by the Society, 30 Pearl Assurance Buildings, Bradford, Yorkshire, England.

As many widely different embodiments of this invention can be made without departing from the spirit and scope thereof, it is to be understood that the invention is not to be limited except as defined by the claims.

What is claimed is:

1. A salt of a vinylpyridine polymer with an acid dye, said polymer being insoluble in water but soluble in 1% aqueous acetic acid.

2. A salt of a polyvinylpyridine with an acid dye, said polyvinyl pyridine being insoluble in water but soluble in 1% aqueous acetic acid.

3. A salt of poly-2-vinylpyridine with an acid dye, said poly-2-vinylpyridine being insoluble in water but soluble in 1% aqueous acetic acid.

4. The process of making polymeric salts which comprises admixing an acid dye with a vinylpyridine polymer which is water-insoluble but soluble in 1% aqueous acetic acid in an aqueous medium and recovering the precipitated polymeric acid dye salt.

5. The process of making polymeric salts which comprises admixing an acid dye salt with a vinylpyridine polymer which is water-insoluble but soluble in 1% aqueous acetic acid in an aqueous acidic medium and recovering the precipitated polymeric acid dye salt and reprecipitating it.

6. The process which comprises admixing in an aqueous medium an acid dye with a polyvinylpyridine which is water-insoluble but soluble in 1% aqueous acetic acid and recovering a polymeric salt of said acid dye with said polymer of polyvinylpyridine.

7. The process which comprises admixing in an aqueous medium from 0.01 to 0.5 moles of an acid dye with a mole of polyvinylpyridine which is water-insoluble but soluble in 1% aqueous acetic acid and recovering a polymeric salt of said acid dye with said polyvinylpyridine and reprecipitating such salt.

8. The process which comprises admixing in an aqueous medium from 0.01 to 0.5 moles of an acid dye with a poly-2-vinylpyridine which is water-insoluble but soluble in 1% aqueous acetic acid and recovering a polymeric salt of said acid dye with said poly-2-vinylpyridine.

WILLIAM RUSSELL SANER.

REFERENCES CITED

The following references are of record in the file of this patent:

UNITED STATES PATENTS

| Number | Name | Date |
|---|---|---|
| 2,448,542 | McQueen et al. | Sept. 7, 1948 |

Certificate of Correction

Patent No. 2,564,726                                                             August 21, 1951

WILLIAM RUSSELL SANER

It is hereby certified that error appears in the printed specification of the above numbered patent requiring correction as follows:

Column 5, line 64, for "coacting" read *coating*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*